United States Patent [19]
Weiner

[11] 4,093,379
[45] June 6, 1978

[54] METHOD AND APPARATUS FOR MAKING PHOTOGRAPHIC COPIES

[75] Inventor: Manfred Weiner, East Meadow, N.Y.

[73] Assignee: Ehrenreich Photo-Optical Industries, Inc., Garden City, N.Y.

[21] Appl. No.: 723,210

[22] Filed: Sep. 14, 1976

[51] Int. Cl.² .................. G03B 27/52; G03B 27/32
[52] U.S. Cl. ............................................. 355/77; 355/63
[58] Field of Search ............... 355/1, 60, 62, 63, 77; 354/81, 152

[56] References Cited

U.S. PATENT DOCUMENTS

| | | | |
|---|---|---|---|
| 2,763,182 | 9/1956 | Urban et al. | 355/62 X |
| 2,940,371 | 6/1960 | Thurow | 354/81 |
| 3,036,495 | 5/1962 | Kuster | 355/60 |
| 3,565,524 | 2/1971 | Pabst et al. | 355/1 |
| 3,672,284 | 6/1972 | Schwarz | 355/1 X |
| 3,842,424 | 10/1974 | Tsunekawa et al. | 354/152 X |

FOREIGN PATENT DOCUMENTS

| | | | |
|---|---|---|---|
| 907,175 | 6/1945 | France | 355/62 |
| 860,453 | 12/1952 | Germany | 355/60 |

*Primary Examiner*—Donald A. Griffin
*Attorney, Agent, or Firm*—Roy C. Hopgood; John M. Calimafde; Charles W. Neill

[57] ABSTRACT

This improved photocopying system projects light from the finder of a camera and through the camera lens to illuminate, on a copy support, the exact area that the camera will photograph. The material to be copied is composed accurately in the illuminated field, the copy lights are turned on, and the camera is operated to make a photocopy. Optical fibers are used to supply light to the finder without overheating the camera.

3 Claims, 2 Drawing Figures

METHOD AND APPARATUS FOR MAKING PHOTOGRAPHIC COPIES

BACKGROUND AND SUMMARY OF INVENTION

This invention provides for accurate 35 mm copies of art work without the inconvenience of trying to align the copy accurately through the camera. It is ideal for audio-visual, graphic arts, T-V, and other fields where accurate composing is necessary in order to center or otherwise locate copy material as necessary for the intended purpose. The invention makes it no longer necessary to resort to the tedious and time-consuming work of focusing through the camera eyepiece; but provides for focusing which brings the hair lines, or other markings on a reflex camera screen, into focus on an area of a copy support on which light is projected through the camera from the finder eyepiece. To prevent possible overheating of the camera by a strong illumination source, the preferred embodiment of this invention supplies light to the camera eyepiece through a fiber optic system. The screen of the finder is illuminated and an image of the screen is projected through the camera lens to the support on which the work to be copied will be composed. composing of the copy is done in the illuminated field and without copy lights. The camera is adjusted toward and from the work support to change the size of the field to suit the work to be copied; and the camera is focused so as to bring the hairlines or other markings on the finder screen into focus on the work surface.

All composing can be done with the operator standing in a convenient position, and at no time is it necessary for the operator to view the work through the camera finder in accordance with previous practices. When the work is ready for copying, the copy lights are turned on and the camera is operated to photograph the field which was outlined by the light projected from the camera lens. No composing need be done working in the glare of hot copy lamps, and there is no risk of overheating any of the copy during composition.

In addition to the greater convenience and comfort to the operator, this invention obtains more accurate work and at substantially lower cost because of the increased rate of production which is made possible.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
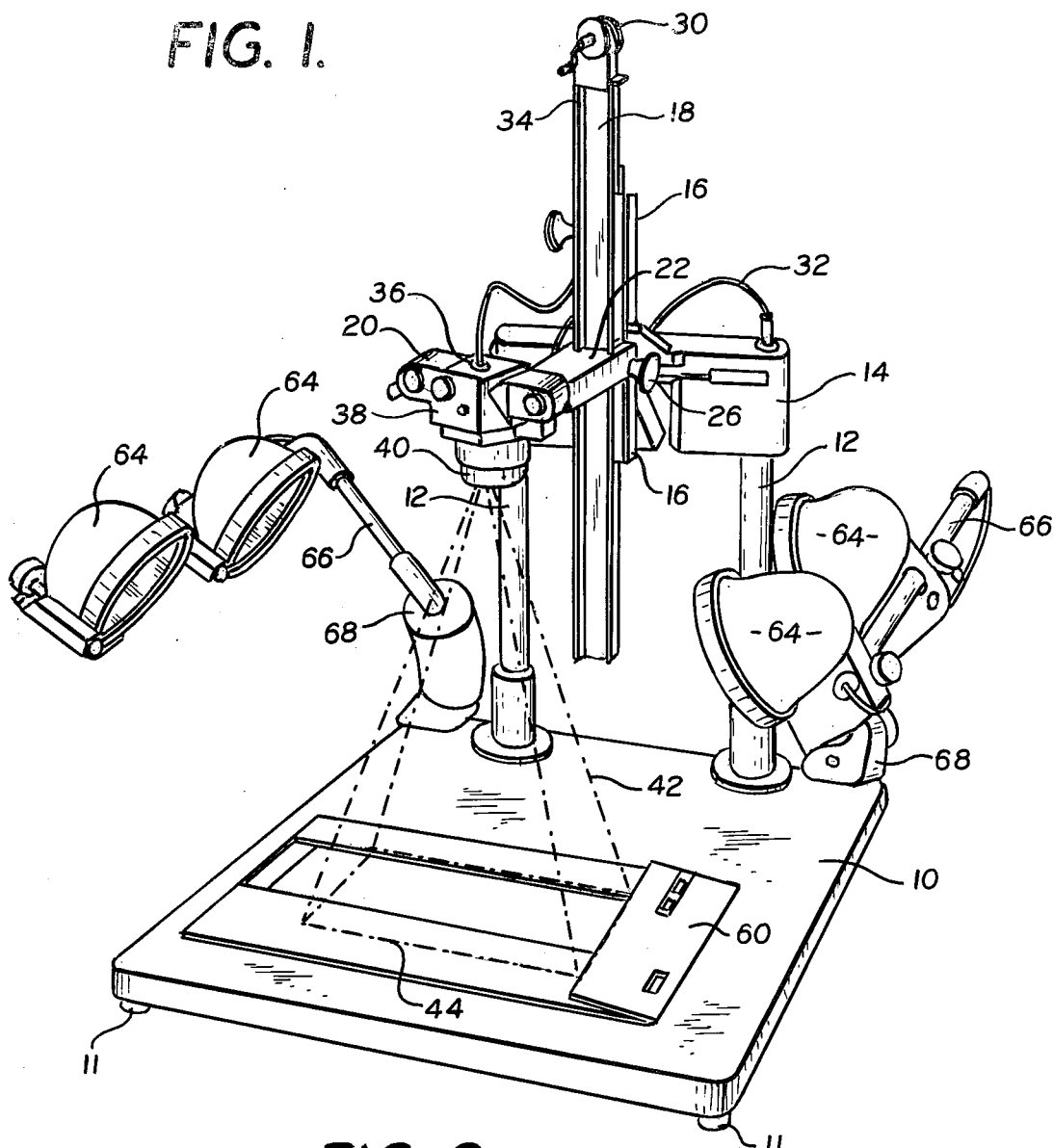
FIG. 1 is an isometric view showing photocopying apparatus made in accordance with this invention.

FIG. 1 shows a flat support 10 having a top surface which provides a field on which work to be copied can be placed. The support 10 has short legs 11 which can be made adjustable for leveling, if desired. At one end of the support 10 there are posts 12 rigidly connected at their lower ends to the support 10. These posts 12 extend upwardly parallel to one another, and they hold a frame 14 in a fixed position above one end of the support 10.

Frame 14 has a vertical guide 16 in which a slide 18 moves up and down to shift a camera 20 toward and from the top surface of the support 10.

The camera 20 is connected with the slide 18 by a bracket 22 which extends forwardly over the work support 10 so as to locate the camera 20 over a mid region of the top surface of the support 10. The bracket 22 is connected with a portion of the frame 14 which is movable up and down, with the slide 18, by rack and pinion mechanism operated by a knob 26. There is no detailed view of the rack and pinion mechanism, since this is a well-known mechanical expedient and its illustration is not necessary for a complete understanding of this invention.

A source of light, preferably at 50 watt quartz-halogen lamp 30, is attached to the slide 18 at a location spaced from the camera 20. Electric power is supplied to the lamp 30 through a conductor 32 which extends upwardly through the post 12 and then behind the slide 18, so that the entire length of the conductor 32 is not visible in FIG. 1.

A fiber optic system 34 transmits light from the lamp 30 to an eyepiece 36 of a finder 38 of the camera 20. The light is projected through the finder and from the camera lens, designated by the reference character 40, along a diverging beam, indicated in FIG. 1 by the lines 42. The area illuminated by this light beam 42, on the area of the support 10, is indicated by broken lines 44.

It will be evident that the size of the illuminated field 44 can be increased or decreased by moving the camera 20 further from or closer to the support 10 by means of the rack and pinion mechanism operated by the knob 26.

Figure 2:
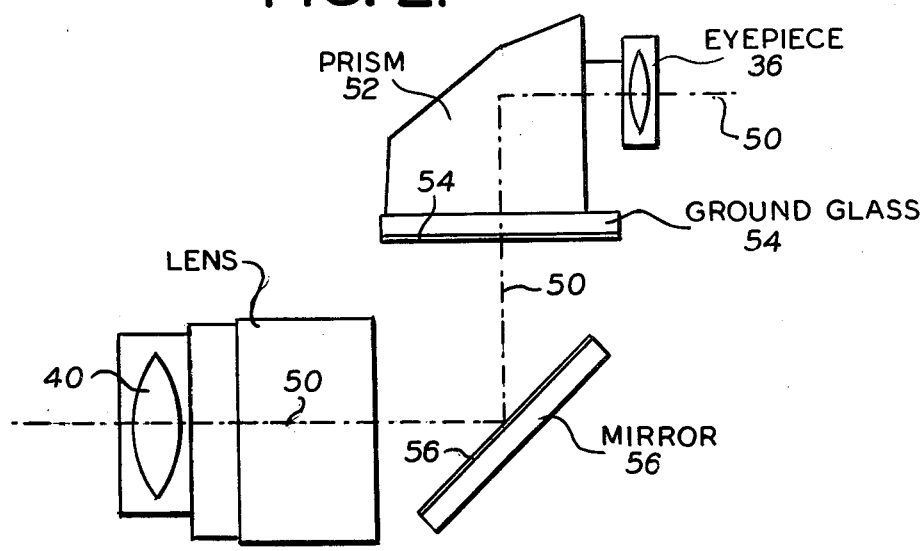
FIG. 2 is a diagram showing the way in which the light is projected through the eyepiece of the camera and from the camera lens for illuminating the camera's field of vision.

FIG. 2 is a diagram showing the way in which the light passes through the camera. Light, designated by the reference character 50, is supplied to the eyepiece 36 from the fiber optic system 34, shown in FIG. 1. This light 50 is reflected by a prism 52 downward against a ground glass or screen 54 of the camera finder.

The light from the illuminated ground glass 54 continues downward to the reflex mirror 56 of the camera; and this mirror 56 reflects the light 50 from the ground glass outward through the camera lens 40. Thus the light beam 42 (FIG. 1) which illuminates the working space on the support 10 is actually an image of the ground glass 54 in the camera.

Reflex cameras almost always have hairlines or other marking on the ground glass, and the camera 20 should be a camera having such marking, because the camera is focused by bringing the hairline or other marking of the ground glass into focus on the surface of the table or support 10 or on the surface of the work which is located in the light projection area 44.

Work to be copied is placed on the surface of the support 10, and an example of such work is designated by the reference character 60. The work is composed in accordance with the field illuminated by the lighted area 44. The expression "composed" is used in a broad sense to designate not only the bringing together of different pieces which are to be photographed simultaneously, but also to designate the positioning of a single copy piece at a central area or any other desired location which will correspond to a similar location in the picture taken by the camera as a result of the photocopying step.

When the work has been properly composed and the camera is focused, copying lights, designated by the reference character 64, are turned on to provide bright illumination of the work to be copied. These copy lights 64 are supported by adjustable brackets 66 connected with one end of the support 10 by mounting brackets 68. Copying lights easily generate substantial heat; and one of the outstanding advantages of this invention is that the composing of the work to be copied can be done before the copy lights are turned on. This prevents possible damage or crinkling of the copy work from excessive and uneven heating prior to the photocopying of the work.

The preferred embodiment of the invention has been illustrated and described, but changes and modifications can be made and some features can be used in different combinations without departing from the invention as defined in the claims.

What is claimed is:

1. The method of composing and photocopying graphic material, which method comprises locating a copying camera, having a viewfinder in one wall thereof, in position to photograph an area of a work support, projecting light, from outside the camera, through the viewfinder of the camera toward the camera lens, through the camera lens and onto the work support to illuminate the area of the work support that the camera will photograph, preventing overheating of the camera by locating the source of light at such a distance from the camera that heating of the light source does not reach the camera, focusing the camera, as necessary, for photographing the area of the support that is illuminated by said light, composing the graphic material with respect to the limits of the illuminated area, supplying to the graphic material additional light for copying, and operating the camera, while in its light-projecting position, to photograph the graphic material, characterized by transmitting said light from its source to a viewfinder of the camera by passing the light through a fibre optic bundle to avoid heating of the eyepiece and the camera by the light source, using a camera that has a finder screen with marking thereon, and focusing the camera on the area to be photographed by adjusting the focus to bring the image of the markings on the finder's screen into sharp focus on the illuminated area of the work support, using copying lights to illuminate the graphic material when photographing said material with the camera, and composing the art material while the copying lights are extinguished so that the area illuminated by the light projected by the camera is clearly defined with light of lower intensity than that required for copying, maintaining the work support under low illumination during composing of the graphic material whereby the contrast is improved between the area illuminated by the light projected from the camera and adjacent surfaces of the work support, using a flat horizontal surface as the work support, locating the camera above the support with the projection axis substantially normal to said support, holding the camera on a mechanically adjustable holder that shifts the camera toward and from the work support to obtain a desired field of coverage, using as the copying camera a reflex camera having its objective lens at the front of the camera and its viewfinder at the back of the camera, and projecting the light through a viewfinder to illuminate the area on the work support whereby the light projected on the work support for composing the graphic material, and the light that copies the graphic material, pass through the same camera lens.

2. The method of using a reflex camera, that has a marking on a ground image screen and an eyepiece in a wall of the camera for viewing the ground glass screen, to copy work on a support viewed by the camera and that has bright copy lights for illuminating on said support that is to be copied, which method comprises
   a. bringing cold light from a source remote from the camera;
   b. projecting the light through the eyepiece and the ground glass of the camera, and through the camera lens to the work support;
   c. locating the camera toward and from the work support and to a position that spreads the light from the camera over a field as large as the work to be copied;
   d. retaining the camera fixed in said position that illuminates said field;
   e. focusing an image of the ground glass marking on the work support while the camera is in said position and with the bright lights extinguished;
   f. composing work to be copied on the work support and within the field illuminated by the light supplied to the work support through the camera lens, and
   g. then lighting the bright copy lights and operating the shutter and camera wth the camera in said fixed position, to photograph the work composed on said support.

3. The method described in claim 2 characterized by transmitting said light from its source to the viewfinder of the camera by passing the light through a fibre optic bundle to avoid heating of the eyepiece and the camera by the light source.

* * * * *